(12) United States Patent
Mertz et al.

(10) Patent No.: US 11,018,767 B2
(45) Date of Patent: May 25, 2021

(54) DIGITAL NONLINEAR PHASE COMPENSATOR FOR LEGACY SUBMARINE CABLES

(71) Applicant: Infinera Corp., Sunnyvale, CA (US)

(72) Inventors: Pierre Herve Mertz, Baltimore, MD (US); Adbullah Karar, Kingston (CA)

(73) Assignee: Infinera Corporation, San Jose, CA (US)

(*) Notice: Subject to any disclaimer, the term of this patent is extended or adjusted under 35 U.S.C. 154(b) by 0 days.

(21) Appl. No.: 16/844,530

(22) Filed: Apr. 9, 2020

(65) Prior Publication Data

US 2020/0328811 A1 Oct. 15, 2020

Related U.S. Application Data

(60) Provisional application No. 62/832,359, filed on Apr. 11, 2019.

(51) Int. Cl.
*H04B 10/61* (2013.01)
*H04B 10/2507* (2013.01)
*H04B 10/079* (2013.01)

(52) U.S. Cl.
CPC ... *H04B 10/2507* (2013.01); *H04B 10/07953* (2013.01); *H04B 10/07955* (2013.01); *H04B 10/61* (2013.01); *H04B 10/6163* (2013.01)

(58) Field of Classification Search
CPC ......... H04B 10/075–0799; H04B 10/25–2572; H04B 10/61–65
USPC ................ 398/104, 105, 147–150, 158–161, 398/202–214
See application file for complete search history.

(56) References Cited

U.S. PATENT DOCUMENTS

| 9,071,364 | B1* | 6/2015 | Voois | H04B 10/2507 |
| 2014/0093240 | A1* | 4/2014 | Mertz | H04B 10/29 398/48 |
| 2014/0178065 | A1* | 6/2014 | Mertz | H04B 10/2557 398/43 |
| 2016/0094292 | A1* | 3/2016 | Mochizuki | H04B 10/6161 398/208 |
| 2016/0261347 | A1* | 9/2016 | Karar | H04B 10/5055 |
| 2016/0285562 | A1* | 9/2016 | Ogasahara | H04B 10/6164 |
| 2016/0294480 | A1* | 10/2016 | Mertz | H04B 10/6163 |
| 2016/0323039 | A1* | 11/2016 | Sun | H04J 14/026 |
| 2017/0254957 | A1* | 9/2017 | Nakano | G02B 6/2766 |
| 2018/0234184 | A1* | 8/2018 | Tanimura | H04B 10/6161 |
| 2018/0269983 | A1* | 9/2018 | Karar | H04L 27/3411 |

* cited by examiner

*Primary Examiner* — Li Liu
(74) *Attorney, Agent, or Firm* — Dunlap Codding PC

(57) ABSTRACT

A method and system are herein disclosed. A coherent optical receiver receives a first optical data carrier signal at a first instant of time and a second optical data carrier signal at a second instant of time, generates at least four first data streams from the first optical data carrier signal and at least four second data streams from the second optical data carrier signal; and circuitry calculates a first aggregate power of the first data streams and a second aggregate power of the second data streams; applies an adjustable temporal low pass filter to the first aggregate power and the second aggregate power resulting in a compensation power, the adjustable temporal low pass filter adjusted to achieve a performance metric; and phase-rotates the first data streams and the second data streams proportional to the compensation power.

20 Claims, 5 Drawing Sheets

DIGITAL NONLINEAR PHASE COMPENSATOR FOR LEGACY SUBMARINE CABLES

INCORPORATION BY REFERENCE

The present patent application claims priority to the provisional patent application identified by U.S. Ser. No. 62/832,359, filed on Apr. 11, 2019, the entire content of which is hereby incorporated herein by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks include both free-space optical networks and fiber optic networks. Free-space networks transmit signals across open space without the use of a specific medium for the light. An example of a free-space optical network includes Starlink by SpaceX. A fiber-optic network, however, utilizes fiber optic cables made of glass fiber to carry the light through a network.

In fiber optic communications, "perturbation" is a deviation in the optical signal from its normal course caused by an outside influence. Nonlinearity is a particular type of perturbation in which the behavior of the optical signal transmitted from a transmitter to a receiver deviates from its normal course and does not vary in direct proportion to the optical signal transmitted at the transmitter. Examples of nonlinearities include intra-channel nonlinearities, stimulated Brillouin scattering (SBS), stimulated Raman scattering (SRS), four wave mixing (FWM), self-phase modulation (SPM), cross-phase modulation (XPM), and intermodulation. To correct for nonlinear perturbation, nonlinear compensation techniques are used to simulate the normal course of the optical signal and are key to correcting for nonlinear perturbation and thereby improving capacity and performance in future optical communications.

One nonlinear compensation technique is known as back propagation. Back propagation is a technique that may be used to compensate nonlinear effects in fiber optic links in fiber optic communications. Back propagation simulates error backward down the fiber optic link to address the non-linear effects within the received optical signal. However, back propagation is very computationally intensive.

Other types of nonlinear compensation techniques use perturbative pre- or post-distortion to increase the reach of optical signals in fiber optic communications. The perturbation induced by the fiber optic link is typically calculated using non-linear perturbation distortion coefficients (Cm,n) and the known or recovered transmitted data. The non-linear perturbation coefficients are typically calculated using known fiber optic link parameters, such as pulse width, inverse of symbol rate, the transmission distance, dispersion map, fiber type, amplifier spacing, and fiber nonlinear parameters.

Generally, subsea optical communication systems communicate over long distances by operating at constant optical power. The designed power of a data channel in the subsea optical communication system is the total constant power (in dBm or milliwatts) divided by the number of data channels that can fit within the repeater bandwidth of the subsea communication line. When the subsea optical communication system is not fully populated with data channels, such as during early installations or during upgrades where fewer higher capacity channels can replace many legacy channels, the power per channel of those fewer channels will be higher than the designed optimal power. In contrast, terrestrial communication lines generally use constant gain amps, that is, as channels are added power is added such that the power is the same for each channel.

Dispersion is a physical phenomenon that occurs within fiber optic links. Dispersion is defined as a separation of light into colors by refraction or diffraction with formation of a spectrum. Unwanted dispersion in a fiber optic link can degrade the performance and/or the distance that the fiber optic link can be used for transmitting data. To overcome issues involving dispersion, legacy submarine fiber optic links can contain dispersion management features resulting in a zero-dispersion window (ZDW), or flat near-zero dispersion across the repeater bandwidth when using particular types of dispersion compensating optical fiber including D+/D− fiber. Coherent optical carriers typically experience high nonlinearities in submarine links, thereby limiting the data capacity of the coherent optical carriers. The dispersion compensating fiber (DCF) in legacy submarine cables is spliced as part of the cable, unlike legacy terrestrial cables where the DCF is installed as spools in the mid-state of the optical amplifiers inside accessible repeater locations. Whereas the DCF can be easily removed on terrestrial links, fixed DCF in subsea links causes the dispersion map of legacy cables designed for direct detection with 10G line cards to remain in place, even when using modern coherent line cards that can compensate for trans-pacific lengths of fiber dispersion inside a digital signal processor. The near-zero dispersions of the legacy cables, however, result in higher nonlinearities than in improved dispersion unmanaged cables due to neighboring channels repeatedly interacting and/or interfering with each other throughout the length of the fiber optic cable. But, there are many existing DCF in subsea links that would be costly to be replaced with the improved dispersion unmanaged cables.

Thus, a need exists for a system and method that extends the life of dispersion compensation fiber in legacy submarine links by enabling upgrades with higher capacities and improved performance in a wavelength division multiplexing environment by, in part, compensating for the higher nonlinearities seen in legacy dispersion compensation fiber optic cables. It is to such a system and method that the present disclosure is directed.

SUMMARY

The problem of extending the life of dispersion compensation fiber in legacy submarine links, is addressed by a coherent optical receiver that receives a first optical data carrier signal at a first instant of time and a second optical data carrier signal at a second instant of time and generates at least four first data streams from the first optical data carrier signal and at least four second data streams from the second optical data carrier signal; and circuitry that calculates a first aggregate power of the first data streams and a second aggregate power of the second data streams; applies an adjustable temporal low pass filter to the first aggregate power and the second aggregate power resulting in a compensation power, the adjustable temporal low pass filter adjusted to achieve a performance metric; and phase-rotates the first data streams and the second data streams proportional to the compensation power.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
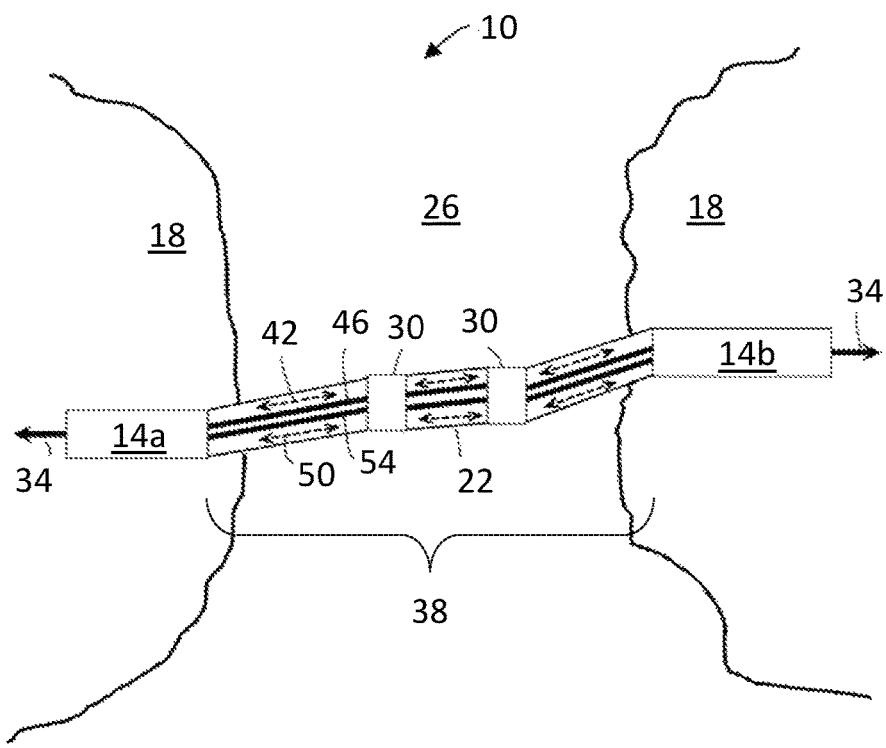
FIG. 1 is a block diagram of an exemplary subsea communication system.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, magnetically based, and/or the like. Further, the messages described herein may be generated by the components and result in various physical transformations.

The methods and systems herein disclosed may be used in optical networks. In one embodiment, the optical network has one or more band, or portion of wavelength. As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An Optical Cross-Connect is a device for switching at least a portion of a spectrum of light in an optical signal received on an input optical port to any (one or more) output optical port. An optical cross-connect can be configured on ROADM network elements, with a built-in wavelength selective switch (WSS) component that is used to route an optical signal in any of the fiber degree or direction. For example, an exemplary optical cross connect can be formed within a wavelength selective switch by opening a specified channel, or specific spectrum of light on an input port of the wavelength selective switch. Configuring or pre-configuring an optical cross-connect may be accomplished by providing instructions to a device to cause the device to switch at least a portion of a spectrum of light in an optical signal received on an input port to any (one or more) output optical port.

As used herein, a span, or link, is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated. For example, the fiber optic cable may not be terminated at an optical in-line amplifier (described in detail below).

As used herein, a transmission line segment is the portion of a transmission line from a first node (e.g., ROADM) transmitting a transmission signal to a second node (e.g., ROADM) receiving the transmission signal. The transmission line segment may include one or more optical in-line amplifier situated between the first node and the second node and may include a single or multiple span(s).

Amplified spontaneous emission (ASE) is light produced by spontaneous emission that has been optically amplified by the process of stimulated emission in a gain medium. ASE is an incoherent effect of pumping a laser gain medium to produce a transmission signal. If an amplified spontaneous emission power level is too high relative to the transmission signal power level, the transmission signal in the fiber optic cable will be unreadable due to the low signal to noise ratio.

Raman scattering, also known as spontaneous Raman scattering, is an inelastic scattering of photons by matter, that is, the direction and energy of the light changes due to an exchange of energy between photons and the medium. Inelastic scattering is a fundamental scattering process in which the kinetic energy of an incident particle is not conserved. Stimulated Raman scattering (SRS) takes place when a signal light interacts in a medium with a pump light (light source or original light), which increases the Raman-scattering rate beyond spontaneous Raman scattering. Signal-Signal Stimulated Raman Scattering is Raman scattering caused by the injection of two or more signal lights into a light stream. Raman gain, also known as Raman amplification, is based on stimulated Raman scattering wherein a lower frequency photon induces the inelastic scattering of a higher-frequency photon in an optical medium.

As used herein, gain is a process wherein the medium on which a transmission signal is traveling transfers part of its energy to the emitted signal, in this case the transmission signal, thereby resulting in an increase in optical power. In other words, gain is a type of amplification of the transmission signal.

As used herein, tilt, also called linear power tilt, is defined as the linear change in power with wavelength over the signal spectrum. Due to Raman gain, short wavelength signals provide Raman gain for longer wavelengths. SRS Tilt strength, that is the difference in gain between the longest wavelength and the shortest wavelength of the signals, depends on the transmission signal power, spectral loading, fiber type, and fiber length. As used herein, the tilt arises from power that is depleted from shorter wavelength signals to amplify longer wavelength signals.

As used herein, dispersion is a physical phenomenon that occurs within fiber optic links. Dispersion is defined as separation of light into colors by refraction or diffraction with formation of a spectrum. As a pulse of light propagates through a fiber, properties of the optical fiber and the light source cause the pulse to disperse, which is referred to in the art as "pulse spreading". Dispersion increases based, at least in part, on the length of the optical fiber. Pulse spreading caused by dispersion, may cause the output pulses of a fiber communication system to overlap, thereby increasing the bit error rate, i.e., lessening performance.

Spectral loading, or channel loading, is the addition of one or more channel to a specific spectrum of light described by the light's wavelength in a transmission signal. When all channels within a specific spectrum are being utilized, the specific spectrum is described as fully loaded. A grouping of one or more channel may be called a media channel. Spectral loading may also be described as the addition of one or more media channel to a specific spectrum of light described by the light's wavelength to be supplied onto the optical fiber as the transmission signal.

A super-channel, as used herein, refers to multiple optical carriers, or channels, that are simultaneously transported over the same optical waveguide (e.g., a single mode optical fiber) and routed together through an optical network. Each optical carrier included in a super-channel may be associated with a particular optical wavelength (or set of optical wavelengths). The multiple optical carriers may be combined to create a super-channel using wavelength division multiplexing and then routed together through the optical network. For example, the multiple optical carriers may be combined using dense wavelength division multiplexing, in which carrier-to-carrier spacing may be less than one nanometer. In some implementations, each optical carrier may be modulated to carry an optical signal.

Line amplifier dynamics (i.e., EDFA, Raman) and interactions in optical fiber (Signal-Signal Raman gain, etc.) are likely to change based on spectral loading changes (such as number of optical channels in the fiber optic cable and/or the wavelength of the present optical channels, etc.) In other words, amplifier and optical fiber dynamics differ when the wavelength of the optical signals, or optical carriers, for existing optical channels change and this causes changes in the tilt.

The present disclosure provides a system and method that includes a coherent optical receiver that receives a first optical data carrier signal at a first instant of time and a second optical data carrier signal at a second instant of time and generates at least four first data streams from the first optical data carrier signal and at least four second data streams from the second optical data carrier signal; and circuitry that calculates a first aggregate power of the first data streams and a second aggregate power of the second data streams; applies an adjustable temporal low pass filter to the first aggregate power and the second aggregate power resulting in a compensation power, the adjustable temporal low pass filter adjusted to achieve a performance metric; and phase-rotates the first data streams and the second data streams proportional to the compensation power.

Referring now to the drawings, and in particular to FIG. 1, an exemplary embodiment of subsea communication system 10 is illustrated therein. Subsea communication system 10 typically includes at least two terminal stations 14a, 14b on land 18 and at least one optical fiber submarine cable 22 extending underwater, such as on the ocean floor 26, between the two terminal stations 14a, 14b. The subsea communication system 10 may also include one or more in-line node 30 between the terminal stations 14a, 14b, which may, in part, boost signals in the optical fiber submarine cable 22. The in-line node 30 may be referred to as a "repeater" that receives, amplifies, and transmits the optical signals thereby increasing a transmission range of the optical signals. Not all subsea communication systems 10 utilize in-line node(s) 30 and the present disclosure may apply to both repeater and repeaterless systems. Terminal stations 14a, 14b typically also provide transmission between the optical fiber submarine cable 22 and at least one terrestrial system 34. The optical fiber submarine cable 22 and the one or more in-line node 30 may collectively be referred to as transmission line segment 38. In one embodiment, the optical fiber submarine cable 22 is one or more slope-matched cable, however, in another embodiment, the optical fiber submarine cable 22 is a dispersion compensated fiber having a zero-dispersion window. In one embodiment, the in-line node 30 may be a repeater or an in-line amplifier.

Subsea communication systems 10 are well known to those having skill in the art and are further described by the International Telecommunication Union (ITU) in its recommendations and literature, such as the following: ITU-T G.971 "General features of optical fibre submarine cable systems," ITU-T G.972 "Definition of terms relevant to optical fibre submarine cable systems," ITU-T G.973 "Repeaterless submarine systems," ITU-T G.974 "Regenerative submarine systems," and ITU-T G.977 "Optically amplified submarine systems."

Subsea communication system 10 typically utilizes Wavelength Division Multiplexing (WDM) such as Dense Wavelength Division Multiplexing (DWDM). Dense Wavelength Division Multiplexing multiplexes multiple optical carrier signals, such as Optical Channel signals or Super-Channel signals, onto a single optical fiber by using different laser light wavelengths.

In subsea communication system 10, one or more optical data carrier signal 42 may be transmitted in one or more optical data channel 46 through the optical fiber submarine cable 22. As previously described, the subsea communication system 10 is in constant power in order to transmit for long distances with low noise. To be able to operate optical data channels 46 through the subsea communication system 10 at a lower power than the constant power, one or more idler signal 50 in one or more idler channel 54 may also be transmitted. The idler channel(s) 54 are transmitted at different frequencies than the optical data channels 46. The idler channel 54 "soaks up" the unwanted power not used by the optical data channels 46 so that the optical data channels 46 may operate at the correct power. For example, idler channel(s) 54 may be used to lower the subsea communication system's 10 optical power in legacy subsea repeater systems which are designed for higher optical power 10G legacy channels.

Figure 2:
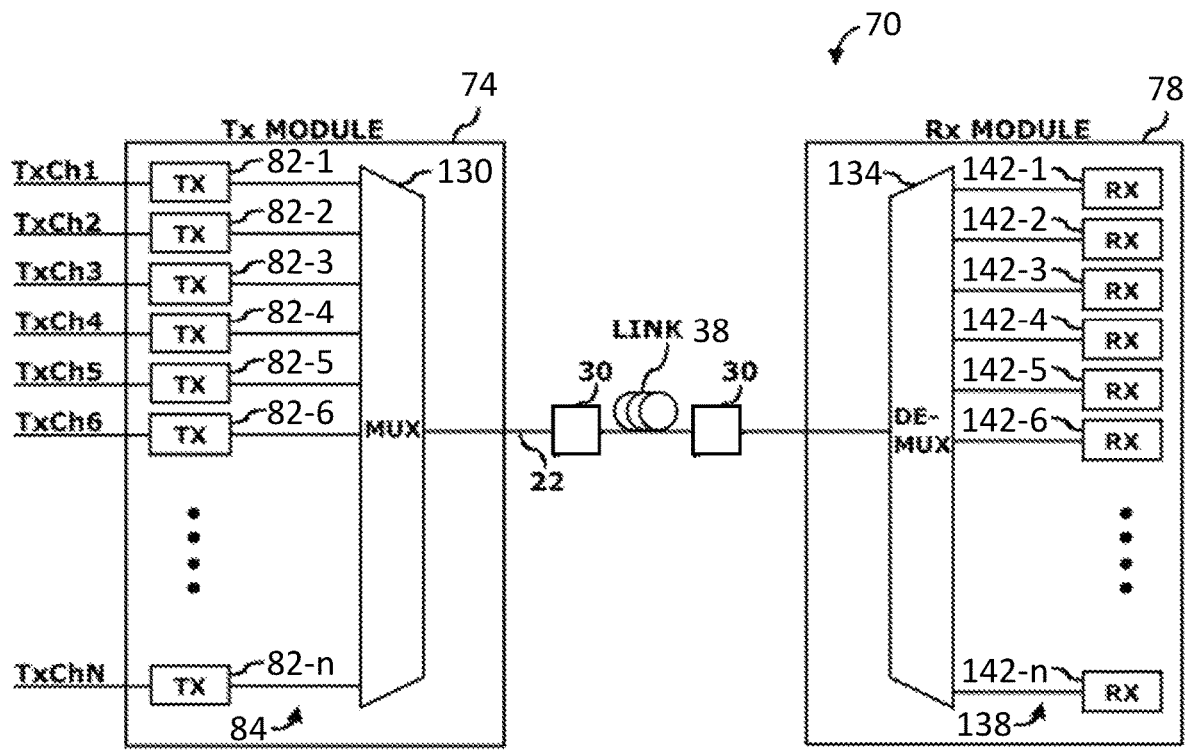
FIG. 2 is a block diagram of an exemplary coherent optical transport system in accordance with the present disclosure.

Referring now to FIG. 2 is a block diagram of an exemplary embodiment of optical mesh network 70 in which systems and/or methods, described herein, may be implemented. While FIG. 2 shows a particular configuration of components in optical mesh network 70, in practice, optical mesh network 70 may include additional components, different components, or differently arranged components than what are shown in FIG. 2. Also, in some instances, one of the components illustrated in FIG. 2 may perform a function described herein as being performed by another one of the components illustrated in FIG. 2. The optical mesh network 70 may be a component of the subsea communication system 10. The optical mesh network 70 includes one or more optical transmitter module 74 (referred to hereinafter as optical transmitter module) and one or more optical receiver module 78 (referred to hereinafter as optical receiver module). For instance, the optical transmitter module 74 and the optical receiver module 78 may be incorporated in the terminal station 14a or the terminal station 14b.

The optical mesh network 70 may be part of a wavelength division multiplexed (WDM) subsea communication system 10. The components in the subsea communication system 10 may support communications over a number of wavelength channels.

As illustrated in FIG. 2, the optical mesh network 70 may include the optical transmitter module 74 (e.g., a Tx PIC) and/or the optical receiver module 78 (e.g., an Rx PIC). In some implementations, transmitter module 74 may be optically connected to optical receiver module 78 via the transmission line segment 38, having at least one link, and/or in-line node 30. The transmission line segment 38 may include at least one in-line node 30 that amplifies the optical data carrier signal 42 as the optical data carrier signal 42 is transmitted over transmission line segment 38 from the transmitter module 74 to the optical receiver module 78.

In use, the transmitter module 74 may modulate a phase of the optical data carrier signal 42 in order to convey data (via the optical data carrier signal 42) to the optical receiver module 78 where the optical data carrier signal 42 may be demodulated such that data, included in the optical data carrier signal 42, may be recovered. A particular modulation format (e.g., phase-shift keying (PSK), quadrature amplitude modulation (QAM), demultiplex quadrature phase shift keying (QPSK), Pol Muxed DQPSK, etc.) may be used to modulate the input signal. Different modulation formats correspond to different distances that the input signal may be transmitted. Further, different modulation formats may result in different bit error rates (BERs) associated with the optical data carrier signal 42.

In modulation formats, the polarization of the optical data carrier signal 42 may be used to modulate the optical data carrier signal 42. Polarization is the direction of the electric field in the lightwave. If the electric field of the lightwave is in the Y Axis, the light is said to be vertically polarized. If the electric field of the lightwave is in the X axis, the light is said to be horizontally polarized. Additionally, the amplitude and the phase of the optical signal may be modulated. There may be an in-phase component (I) of the optical signal proportional to the cosine of the phase shift and a quadrature component (Q) proportional to the sine of the phase shift of the optical signal. Here, "I" and "Q" denote the real and imaginary components of the X and Y polarizations. Therefore, the optical data carrier signal 42 has four (4) analog streams corresponding to the four (4) degrees of freedom of the optical field: XI, XQ, YI, and YQ. When the optical data carrier signal 42 is split into subcarriers, these four (4) analog streams contain the optical field of all the subcarriers combined.

Transmitter module 74 may include a number of optical transmitters 82-1 through 82-n (where n is greater than or equal to 1), waveguides 84, and/or optical multiplexer 130. Each optical transmitter 82 may receive a data channel (TxCh1 through TxChN), modulate the data channel with an optical signal, and transmit the data channel as an optical signal. In one implementation, transmitter module 74 may include 5, 10, 20, 50, 100, or some other number of optical transmitters 32. Each optical transmitter 82 may be tuned to use an optical carrier of a designated wavelength. It may be desirable that the grid of wavelengths emitted by optical transmitters 82 conform to a known standard, such as a standard published by the Telecommunication Standardization Sector (ITU-T).

Figure 3:
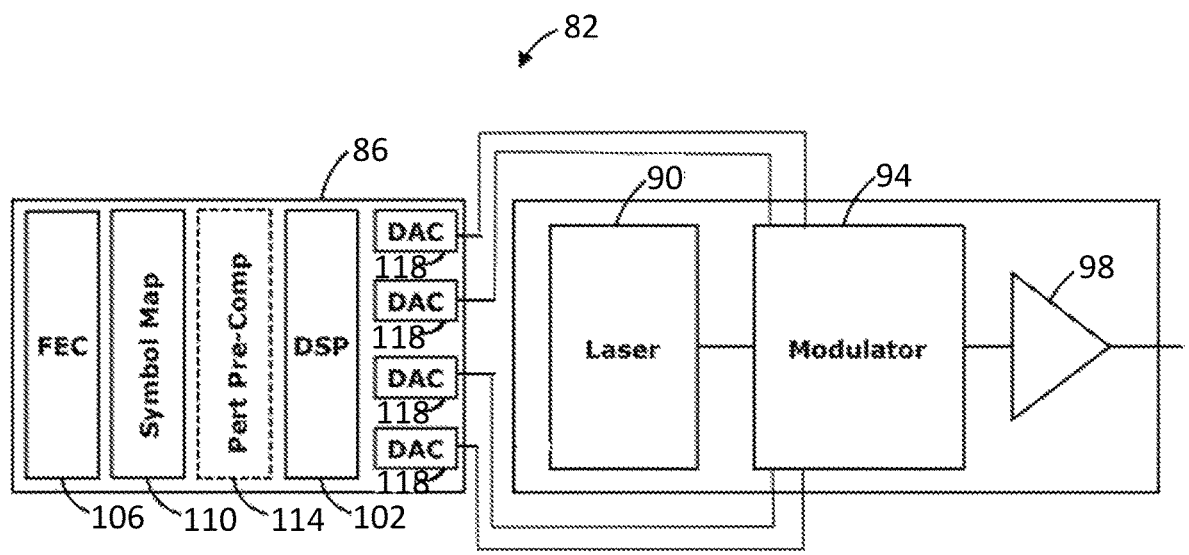
FIG. 3 is a block diagram of an exemplary coherent optical transmitter in accordance with the present disclosure.

It will be understood that the optical transmitters 82-1-n may be implemented in a variety of ways. For example, FIG. 3 is one exemplary implementation of the optical transmitter 82. The optical transmitter 82 may comprise one or more transmitter processor circuit 86, one or more laser 90, one or more modulator 94, one or more semiconductor optical amplifier 98, and/or other components (not shown).

The transmitter processor circuit 86 may have one or more transmitter digital signal processor (DSP) 102, Transmitter Forward Error Correction (FEC) circuitry 106, Symbol Map circuitry 110, transmitter perturbative pre-compensation circuitry 114, and digital-to-analogue converters (DAC) 118. The transmitter processor circuit 86 may be located in any one or more components of the optical transmitter 82, or separate from the components, and/or in any location(s) among the components. The transmitter processor circuit 86 may be in the form of one or more Application Specific Integrated Circuit (ASIC), which may contain one or more module and/or custom module.

Processed electrical outputs from the transmitter processor circuit 86 may be supplied to the modulator 94 for encoding data into optical signals generated and supplied to the modulator 94 from the laser 90. The semiconductor optical amplifier 98 receives, amplifies and transmits the optical signal including encoded data. Processed electrical outputs from the transmitter processor circuit 86 may be supplied to other circuitry in the transmitter processor circuit 86, for example, clock and data modification circuitry. The laser 90, modulator 94, and/or semiconductor optical amplifier 98 may be coupled with a tuning element (e.g., a heater) (not shown) that can be used to tune the wavelength of an optical signal channel output by the laser 90, modulator 94, or semiconductor optical amplifier 98. In some implementations, a single laser 90 may be shared by multiple optical transmitters 82.

Figure 6:
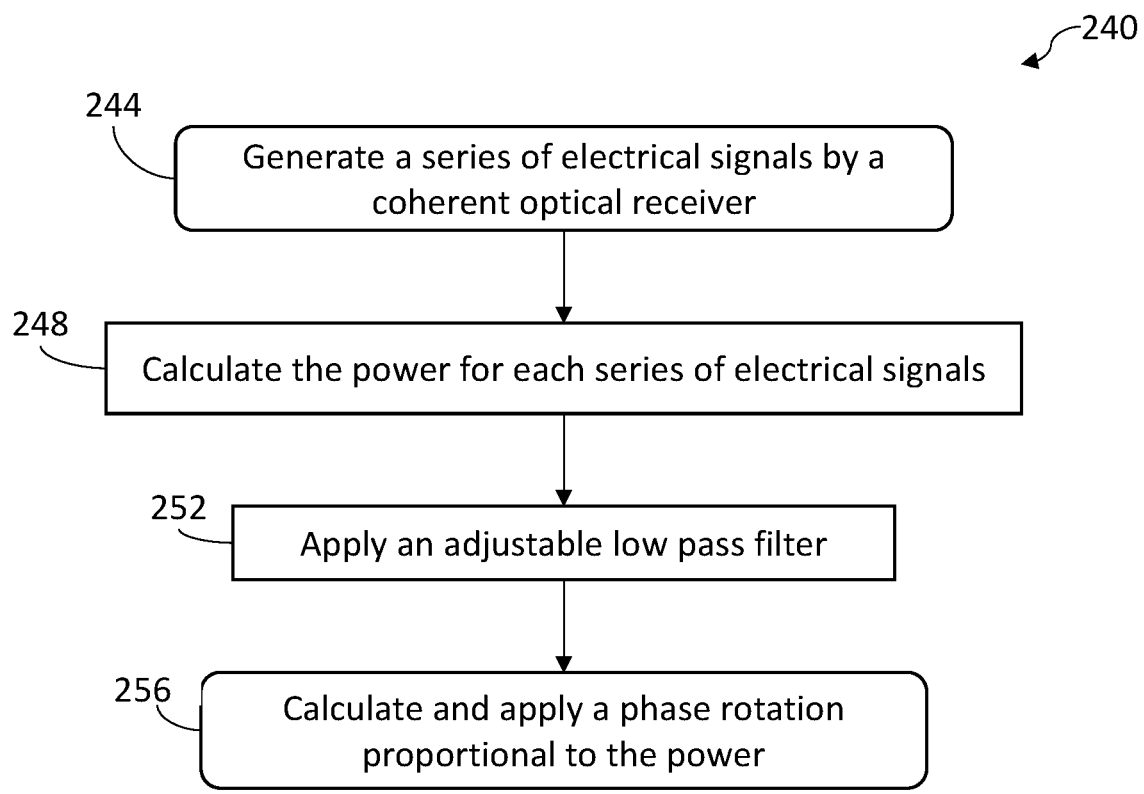
FIG. 6 is a process flow diagram of an exemplary nonlinear mitigation process in accordance with the present disclosure.

Other possible components in the optical transmitter 82 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the content of which is hereby incorporated by reference in its entirety herein. In one embodiment, the processor executable instructions include one or more instructions implementing a nonlinear mitigation process 240 as shown in FIG. 6 and described in detail below.

Returning now to FIG. 2, waveguides 84 may include an optical link to transmit modulated outputs (referred to as "signal channels") of optical transmitters 82. In some implementations, each optical transmitter 82 may connect to one waveguide 84 or to multiple waveguides 84 to transmit signal channels of optical transmitters 82 to optical multiplexer 130. In some implementations, waveguides 84 may be made from a birefringent material and/or some other material.

Optical multiplexer 130 may include an arrayed waveguide grating (AWG) or some other multiplexing device. In some implementations, optical multiplexer 130 may combine multiple signal channels, associated with optical transmitters 82, into a wave division multiplexed (WDM) signal, such as optical data carrier signal 42. Optical data carrier signal 42 may be quadrature phase shift keying (QPSK) optical signals, for example.

As further shown in FIG. 2, optical receiver module 78 may include optical demultiplexer 134, waveguides 138, and/or optical receivers 142-1 through 142-p (where p is greater than or equal to 1). In some implementations, optical demultiplexer 134 may include an AWG or some other device. Optical demultiplexer 134 may receive the optical data carrier signal 42, demultiplex the optical data carrier signal 42 into multiple signal channels, and supply the multiple signal channels to the optical receives 142-1-142-p via waveguides 138. The optical receiver module 78 may be used to demultiplex quadrature phase shift keying (QPSK) optical data carrier signal 42. The one or more optical receiver 142-1 through 142-p may be coherent optical receivers.

As shown in FIG. 2, optical demultiplexer 134 may supply signal channels to optical receivers 142 via waveguides 138. Waveguides 138 may include optical links to transmit outputs of optical demultiplexer 134 to optical receivers 142. In some implementations, each optical receiver 142 may receive outputs via a single waveguide 138 or via multiple waveguides 138. In some implementations, waveguides 138 may be birefringent (e.g., based on the width of waveguides 138).

Optical receivers 142 may each operate to convert an input optical data carrier signal 42 to an electrical signal that represents the transmitted data. In some implementations, optical receivers 142 may each include one or more photodetectors (e.g., four photodetectors) and/or related devices to receive respective input optical data carrier signal 42 outputted by optical demultiplexer 134 and a local oscillator 146, convert the signals to a photocurrent, and provide a voltage output to function as the electrical signal representation of the original input optical data carrier signal 42. Optical receivers 142 may be implemented in other ways, as is well known in the art. Exemplary optical receiver module 78 and optical receiver 142 are further described in in U.S. patent application Ser. No. 12/052,541, titled "Coherent Optical Receiver".

Figure 4:
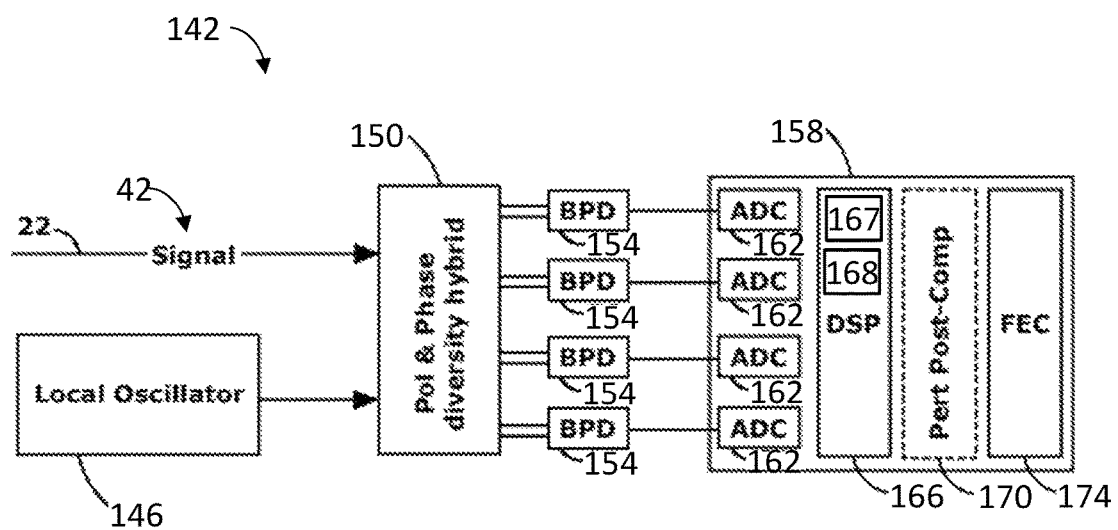
FIG. 4 is a block diagram of an exemplary coherent optical receiver in accordance with the present disclosure.

For example, FIG. 4 illustrates a block diagram of an exemplary optical receiver 142 consistent with the present disclosure. Optical receiver 142 may comprise one or more local oscillator 146, a polarization and phase diversity hybrid circuit 150 receiving the optical data carrier signal 42 and the input from the local oscillator 146, one or more balanced photodiode 154 that produces the electrical signals representative of the optical data carrier signal 42, and one or more receiver processor circuit 158. Other possible components in the optical receiver 142 may include filters, circuit blocks, memory, such as non-transitory memory storing processor executable instructions, additional modulators, splitters, couplers, multiplexers, etc., as is well known in the art. The components may be combined, used, or not used, in multiple combinations or orders.

The one or more receiver processor circuit 158, may comprise one or more analog-to-digital converter (ADC) 162 receiving the electrical signals from the balanced photodiodes 154, one or more receiver digital signal processor (DSP) 166, receiver perturbative post-compensation circuitry 170, and receiver forward error correction (FEC) circuitry 174. The receiver FEC circuitry 174 may apply corrections to the data, as is well known in the art. The one or more receiver processor circuit 158 and/or the one or more receiver DSP 166 may be located on one or more component of the optical receiver 142 or separately from the components, and/or in any location(s) among the components. The receiver processor circuit 158 may be in the form of an Application Specific Integrated Circuit (ASIC), which may contain one or more module and/or custom module. In one embodiment, the receiver DSP 166 may include, or be in communication with, one or more processor 167 and one or more memory 168 storing processor readable instructions, such as software.

The one or more receiver DSP 166 receives and processes the electrical signals with multi-input-multiple-output (MIMO) circuitry, as described, for example, in U.S. Pat. No. 8,014,686, titled "Polarization demultiplexing optical receiver using polarization oversampling and electronic polarization tracking". Processed electrical outputs from receiver DSP 166 may be supplied to other circuitry in the receiver processor circuit 158, such as the receiver perturbative post-compensation circuitry 170 and the receiver FEC circuitry 174.

Various components of the optical receiver module 78 may be provided or integrated, in one example, on a common substrate. Further integration is achieved by incorporating various optical demultiplexer designs that are relatively compact and conserve space on the surface of the substrate.

In use, the optical data carrier signal 42 may be subjected to optical non-linear effects between the optical transmitter module 74 and the optical receiver module 78 such that the optical data carrier signal 42 received does not accurately convey the carried data in the form that the optical data carrier signal 42 was transmitted. The impact of optical nonlinear effects can be partially mitigated by applying perturbative distortion algorithms using one or more of the transmitter perturbative pre-compensation circuitry 114 and the receiver perturbative post-compensation circuitry 170. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler" herein incorporated by reference in its entirety, by use of analysis of one or more incoming optical data carrier signal 42 at the optical receiver module 78.

Further processing of the optical data carrier signal 42, however, is required to compensate optical Kerr nonlinearity. New coherent WDM channels carried on dispersion managed submarine cables, such as optical fiber submarine cable 22, with a zero dispersion windows (ZDW) typically experience a large nonlinear penalty, limiting the capacity of those WDM channels. The ZDW is typically in the central spectral region of legacy submarine cables designed for on-off keyed (OOK) 10G WDM carriers. In the ZDW, the amplitude profile of the optical data carrier signal 42 does not change much as the optical data carrier signal 42 propagates down the optical fiber submarine cable 22, so phase changes caused by the optical Kerr Effect are not randomized as the phase changes would be in highly dispersive fiber. The large net phase changes cause significant penalty of up to 2.5 dB in the central spectral region as compared to shorter wavelengths and longer wavelengths.

Figure 5:
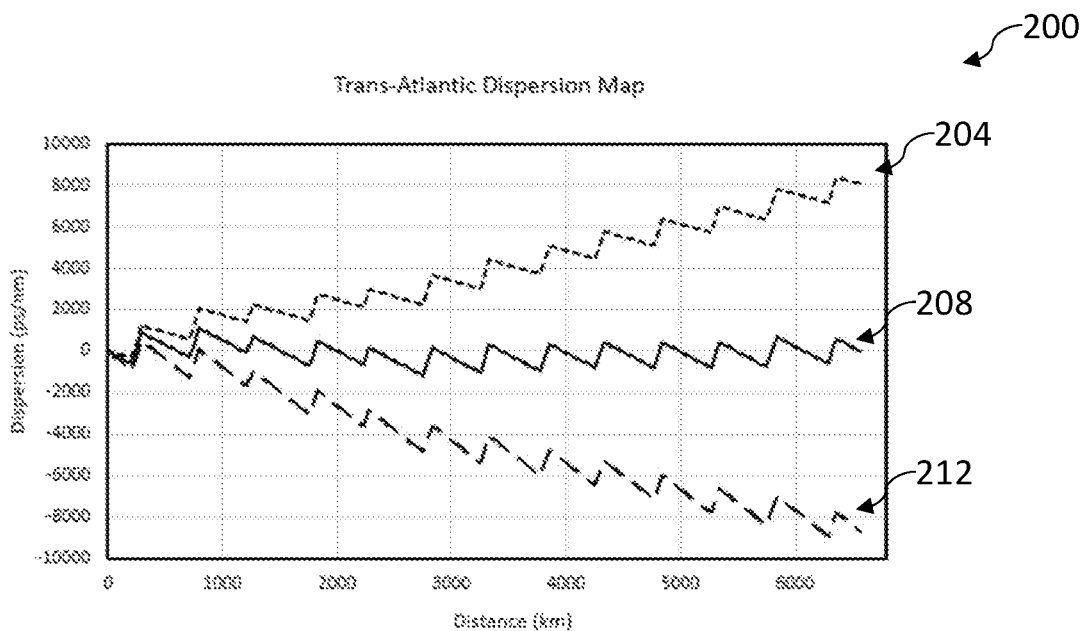
FIG. 5 is an exemplary embodiment of a trans-Atlantic dispersion map in accordance with the present disclosure.

Optical Kerr nonlinearity in fibers, described by the equation $\Delta n(t)=n_2 I(t)$, provides that an index of refraction is proportional to the intensity pattern of the optical field. In dispersion managed optical fiber, such as the optical fiber submarine cable 22, near the ZDW an intensity pattern, as shown in FIG. 5, can be repeated multiple times down the transmission line segment 38 as accumulated dispersion alternates between positive values and negative values.

Referring again to FIG. 5, shown therein is an exemplary embodiment of a trans-Atlantic dispersion map 200 depicting dispersion (in ps/nm) for a distance (in km) for a shorter wavelength plot 204, a center wavelength plot 208, and a longer wavelength plot 212 in legacy submarine DCF cables designed for on-off keyed (OOK) 10G WDM carriers. The phase shift, resulting from the Optical Kerr nonlinearity, causes a nonlinear penalty for modern coherent optical signals which include both phase and amplitude components; however, this nonlinear penalty was not present in legacy amplitude modulated signals. This nonlinear penalty can reach up to a 3 dB Q-factor difference between a center of a repeater gain bandwidth and shorter wavelength and longer wavelength edges of the gain bandwidth. As illustrated in the trans-Atlantic dispersion map 200, the center of the repeater bandwidth has a dispersion near zero as shown by the center wavelength plot 208.

Referring now to FIG. 6, shown therein is an exemplary embodiment of the nonlinear mitigation process 240 that works across subcarriers in the ZDW. As an initial matter, the coherent optical receiver receives multiple optical data carrier signals during a time period. As an example, this is explained herein as receiving by the coherent optical receiver a first optical data carrier signal at a first instant of time, and a second optical data carrier signal at a second instant of time within the time period. The first optical data carrier signal and the second optical data carrier signal are supplied to the balanced photodiodes 154. The nonlinear mitigation process 240 generally comprises steps including: generate a series of at least four first data streams (e.g., electrical signals) from the first optical data carrier signal, and at least four data streams from the second optical data carrier signal (step 244) by balanced photodiodes 154 receiving the first and second optical data carrier signals; calculate the power for each series of electrical signals (step 248) e.g., by calculating a first aggregate power of the first data streams, and a second aggregate power of the second data streams; apply an adjustable temporal low pass filter (step 252) to the first aggregate power and the second aggregate power resulting in a compensation power; and phase-rotate the first data-streams and the second data streams proportional to the compensation power (step 256). In one embodiment, step 248, step 252, and step 256 or some combination thereof are performed by circuitry, such as one or more processor in the receiver processor circuit 158, and, in some embodiments, the receiver digital signal processor 166. In one embodiment, each of steps 248, 252, and 256 may be performed after the electrical signal is processed by the one or more ADC 162 but prior to other processing performed by the receiver DSP 166.

In step 244, the receiver processor circuit 158 of the optical receiver 142 receives a series of the electrical signals (which can be first data streams and second data streams) over a time period. The electrical signals are representative of a series of the optical data carrier signals 42, including but not limited to the first and second optical data carrier signals, received at instants of time within the time period. The one or more balanced photodiode 154 that produces the electrical signals representative of the optical data carrier signal 42 may send the series of the electrical signals to the receiver processor circuit 158 of the optical receiver 142.

In step 248, the power for each series of electrical signals is measured. In one embodiment, the power for each series of electrical signals may be measured by one or more photodiode, such as, for example, four or eight of the balanced photodiodes 154. In another embodiment, the power for each series of electrical signals, such as the at least four data streams from the first optical data carrier signal, and the at least four data streams from the second optical data carrier signal is measured by the one or more ADC 162. An aggregate power for each instant of time, e.g., the aggregate power of the at least four data streams from the first optical data carrier signal, may be measured by aggregating the four (4) data streams of the optical field, XI, XQ, YI, and YQ, such as by using the following power equation:

$$P(t) = XI_t^2 + XQ_t^2 + YI_t^2 + YI_t^2$$

Where, as described above, XI, XQ, YI and YQ denote real and imaginary components of the X and Y polarizations of the optical field.

In step 252, the adjustable temporal low pass filter is applied to the aggregate power P(t) across a time period encompassing multiple aggregate powers calculated for multiple instants of time. The adjustable temporal low pass filter may be described by the following filter equation:

$$\overline{P}(t) = \Sigma_{i=-n}^{n} w_i P(t-i)$$

where the weights $w_i$ can be adjusted to maximize performance of the adjustable temporal low pass filter. Performance may be measured, for example, by measuring a bit error rate. To maximize performance, the bit error rate may be compared to a bit error rate threshold. In another embodiment, error vector magnitude may be used to determine performance.

In step 256, a phase rotation proportional to the power after applying the adjustable temporal low pass filter is calculated with an adjustable gain g to maximize performance such that: $\varphi_P(t) = g\overline{P}(t)$. The phase rotation is then applied to the four data streams, resulting in the following functions resulting in nonlinear compensated data streams:

$$\begin{pmatrix} XI_{tc} \\ XQ_{tc} \end{pmatrix} = \begin{pmatrix} \cos(\varphi_P) & \sin(\varphi_P) \\ \sin(\varphi_P) & \cos(\varphi_P) \end{pmatrix} \cdot \begin{pmatrix} XI_t \\ XQ_t \end{pmatrix}$$

$$\begin{pmatrix} YI_{tc} \\ YQ_{tc} \end{pmatrix} = \begin{pmatrix} \cos(\varphi_P) & \sin(\varphi_P) \\ \sin(\varphi_P) & \cos(\varphi_P) \end{pmatrix} \cdot \begin{pmatrix} YI_t \\ YQ_t \end{pmatrix}$$

The nonlinear compensated data streams then continue through standard DSP processing by the receiver DSP 166.

An additional benefit of the above disclosed nonlinear mitigation process 240 is that the nonlinear mitigation process 240 also compensates for Gordon-Mollenauer nonlinear Amplified Spontaneous Emission (ASE)-to-signal interactions, as well as cross-subcarrier phase modulations. As hereinafter used, a component or device that implements the nonlinear mitigation process 240 may be referred to as a phase nonlinear compensator, or PNC. For example, if a device, e.g., the receiver DSP 166, is described as having PNC turned off, then the device is not applying the nonlinear mitigation process 240 as disclosed above, however, if the device is described as having PNC turned on, then the device is applying the nonlinear mitigation process 240. Additionally, the abovementioned values may be referred to as values attributable to the PNC, such as, for example, the adjustable temporal low pass filter may be referred to as the PNC filter.

Figure 7:
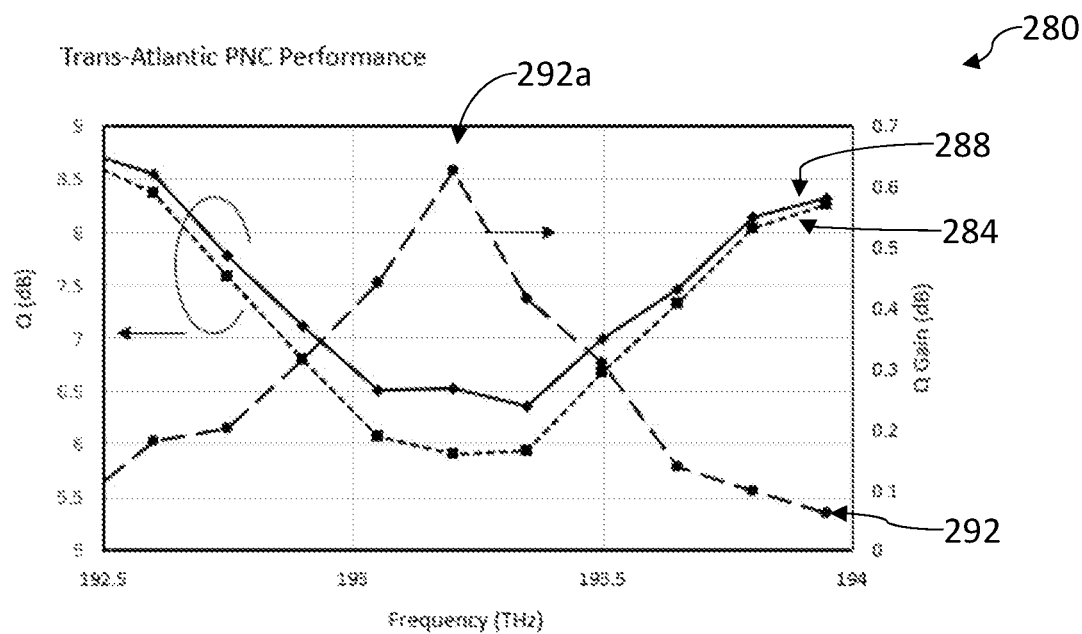
FIG. 7 is a trans-Atlantic phase nonlinear compensator power chart of experimental data implementing an exemplary embodiment of the nonlinear mitigation process.

Referring now to FIG. 7, shown therein is a trans-Atlantic performance chart 280 of a first experiment, graphing results of an exemplary embodiment of the nonlinear mitigation process 240 on a dispersion managed trans-Atlantic cable having a dispersion map as depicted in FIG. 5. Axes shown in the trans-Atlantic performance chart 280 include an X-axis for frequency ranging from 192.5 THz to 194 THz, a first Y-axis being the left-most Y-axis, for Q power in dB ranging from 5 dB to 9 db, and a second Y-axis being the right-most Y-axis, for Q Gain in dB, ranging from 0 dB to 0.7 dB. Three plots are graphed on the trans-Atlantic performance chart 280, including a nonlinear non-mitigated power plot 284 depicted by square icons and a small dashed line, a nonlinear mitigated power plot 288 depicted by diamond icons and a large dashed line, and a nonlinear mitigated gain plot 292 depicted by disc icons and a solid line.

For the first experiment, repeater bandwidth is fully loaded with 37.5 GHz spaced 33G baud carriers having an eight-dimensional (8D) modulation format with three bits per polarization multiplexed symbol (BPS) for a data rate of 75 G per carrier.

The transmitted carriers come from two modulators, each modulating a bank of tunable lasers. The carriers are further temporally decorrelated using a twin WSS where the WSS has system ports that are connected together with varying length patch cables. The receiver measures a channel under test every 9 carriers by tuning its local oscillator. There is no adjustment of carrier powers while changing the channel under test during these final measurements.

Although the 8D modulation format is designed to mitigate nonlinearities there is still a 2.5 dB penalty from the edge of the repeater bandwidth to the middle ZDW.

The nonlinear mitigation process 240 was performed offline on captured data from a real time oscilloscope forming waveforms, thus the nonlinear compensated power plot 288 and the nonlinear non-compensated power plot 284 come from the same waveforms with PNC turned on and off respectively, that is, the nonlinear compensated power plot 288 depicts the captured data processed by the receiver DSP 166 applying the nonlinear mitigation process 240 to the captured data and the nonlinear non-compensated power plot 284 depicts the captured data processed by the receiver DSP 166 but not applying the nonlinear mitigation process 240 to the captured data. Both the PNC filter bandwidth and the PNC gain were optimized at each frequency to maximize the Q-factor gain. The PNC gain, and thus the nonlinear compensated gain plot 292, may be calculated by the difference of the nonlinear compensated power plot 288 less the nonlinear non-compensated power plot 284 for each frequency along the X-axis.

In the ZDW, the PNC gain is up to 0.6 dB as indicated by nonlinear compensated gain plot point 292a, enabling this 3 BPS to function with deployable margins across the entire ZDW. Without the PNC component, only 2 BPS could function with deployable margins across the entire ZDW. Outside the ZDW where dispersion is higher, gain from the PNC component diminishes, but nonlinearities also diminish netting higher Q values, thereby enabling higher BPS modulation formats at the edge.

Figure 8:
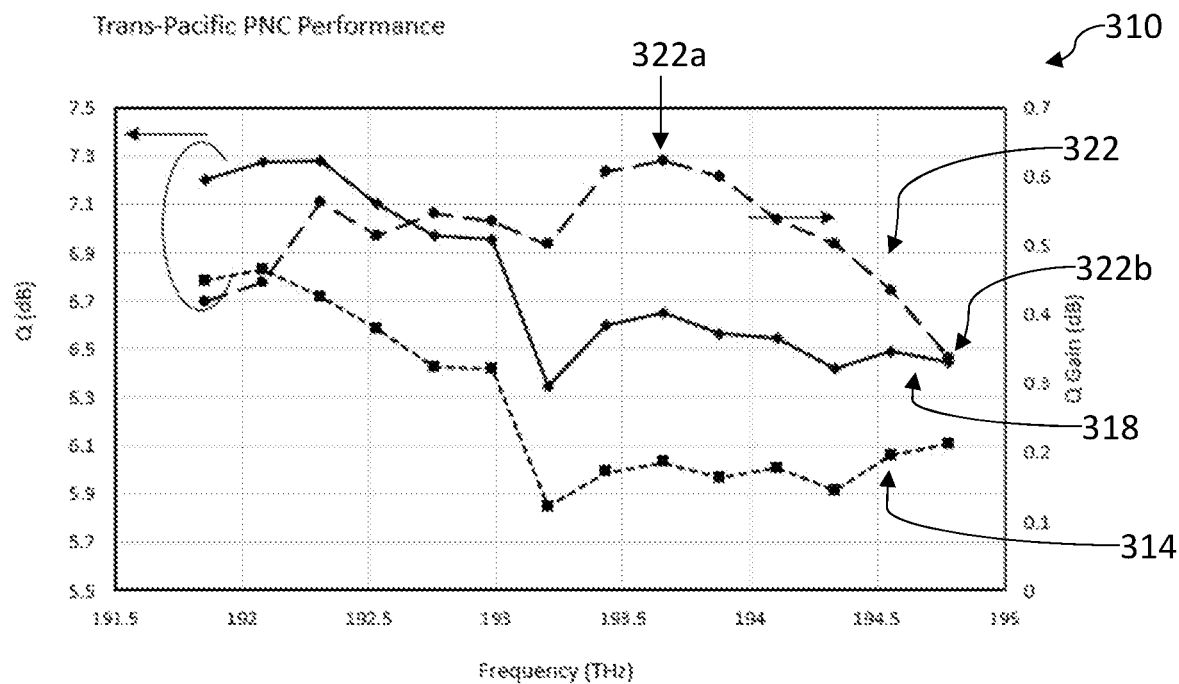
FIG. 8 is a trans-Pacific phase nonlinear compensator power chart of experimental data implementing an exemplary embodiment of the nonlinear mitigation process.

Referring now to FIG. 8, shown therein is a trans-Pacific performance chart 310 of a second experiment, graphing results of an exemplary embodiment of the nonlinear mitigation process 240 on a dispersion managed with slope-matched D+/D– trans-Pacific cable. Axes shown in the trans-Pacific performance chart 310 include an X-axis for frequency ranging from 191.5 THz to 195 THz, a first Y-axis being the left-most Y-axis, for Q-factor power in dB ranging from 5.5 dB to 7.5 db, and a second Y-axis being the right-most Y-axis, for Q-factor Gain in dB, ranging from 0 dB to 0.7 dB. Three plots are graphed on the trans-Pacific performance chart 310, including a nonlinear non-mitigated power plot 314 depicted by square icons and a small dashed line, a nonlinear compensated power plot 318 depicted by diamond icons and a solid line, and a nonlinear compensated gain plot 322 depicted by disc icons and a large dashed line. Slope matched fiber causes the entire spectral bandwidth of a dispersion map to have zero net dispersion. The dispersion map was designed to minimize nonlinearities of direct detect 10G carriers using an overall "zig-zag" shape to walk off neighboring carriers throughout the length of the cable. This dispersion map also enables the nonlinear Q penalty of coherent signals to be less than the ZDW of dispersion managed trans-Atlantic cable.

For the second experiment, the same 37.5 GHz carrier loading is used as during the first experiment, as well as the same modulation format and calculation method of PNC Q-factor gain. As depicted by nonlinear compensated gain plot point 322a, max PNC Q-factor gain is also 0.6 dB in the central region of the spectrum. However, the Q-factor gain drops to 0.4 dB, as indicated by nonlinear compensated gain plot point 322b at the right-most edge of the nonlinear compensated gain plot 322.

Figure 9:
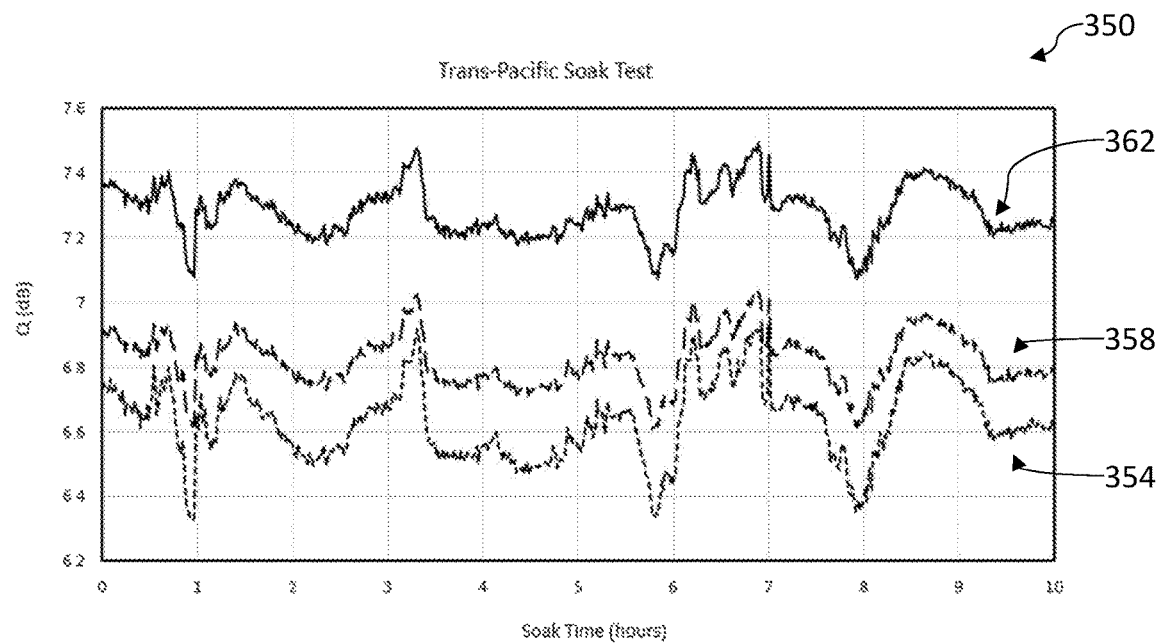
FIG. 9 is a soak test power chart for a trans-Pacific phase nonlinear compensator of experimental data implementing an exemplary embodiment of the nonlinear mitigation process.

Referring now to FIG. 9, shown therein is a trans-Pacific soak test chart 350 of the second experiment graphing soak test results in gain of an exemplary embodiment of the nonlinear mitigation process 240 on a dispersion managed with slope-matched D+/D– trans-Pacific cable and further comparing enabling both the PNC and a nonlinear circuit (NLC). Axes shown in the trans-Pacific soak test chart 350 include an X-axis for soak time in hours ranging from 0 hours to 10 hours and a Y-axis for Q-factor power in dB ranging from 6.2 dB to 7.6 db. Three plots are graphed on the trans-Pacific soak test chart 350, including a nonlinear non-compensated power plot 354, a nonlinear NLC enabled and PNC off power plot 358, and a nonlinear NLC enabled and PNC on power plot 362 depicted by a solid line. The second experiment soak test has live, high-power single pol 10G carriers creating high fluctuations on coherent carriers.

The NLC is a low power circuit that correlates across polarization, frequency, and time to remove fast varying correlations caused by nonlinearities. The NLC circuit generally performs well for compensating the fluctuations caused by high power legacy 10G single polarization carriers. During the second experiment, there were a number of legacy carriers with live traffic that cause higher Q-factor fluctuations than on coherent only cables where all the carriers are polarization multiplexed.

As shown in FIG. 9, enabling the NLC reduces fluctuations from a 5σ of 0.6 dB, shown by the difference between the highest Q and lowest Q of the nonlinear non-compensated power plot 354, down to 0.4 dB, shown by the difference between the highest Q and lowest Q of the nonlinear NLC enabled and PNC off power plot 358, while improving the minimum Q by 0.3 dB, shown by the difference between the nonlinear non-compensated power plot 354 and the nonlinear NLC enabled and PNC off power plot 358. The PNC circuit is complementary to the NLC circuit by operating on the phase of the receive signal, further improving the minimum Q-factor by 0.5 dB, shown by the difference between the nonlinear NLC enabled and PNC off power plot 358 and the nonlinear NLC enabled and PNC on power plot 362, resulting in a total gain of 0.8 dB.

Figure 10:
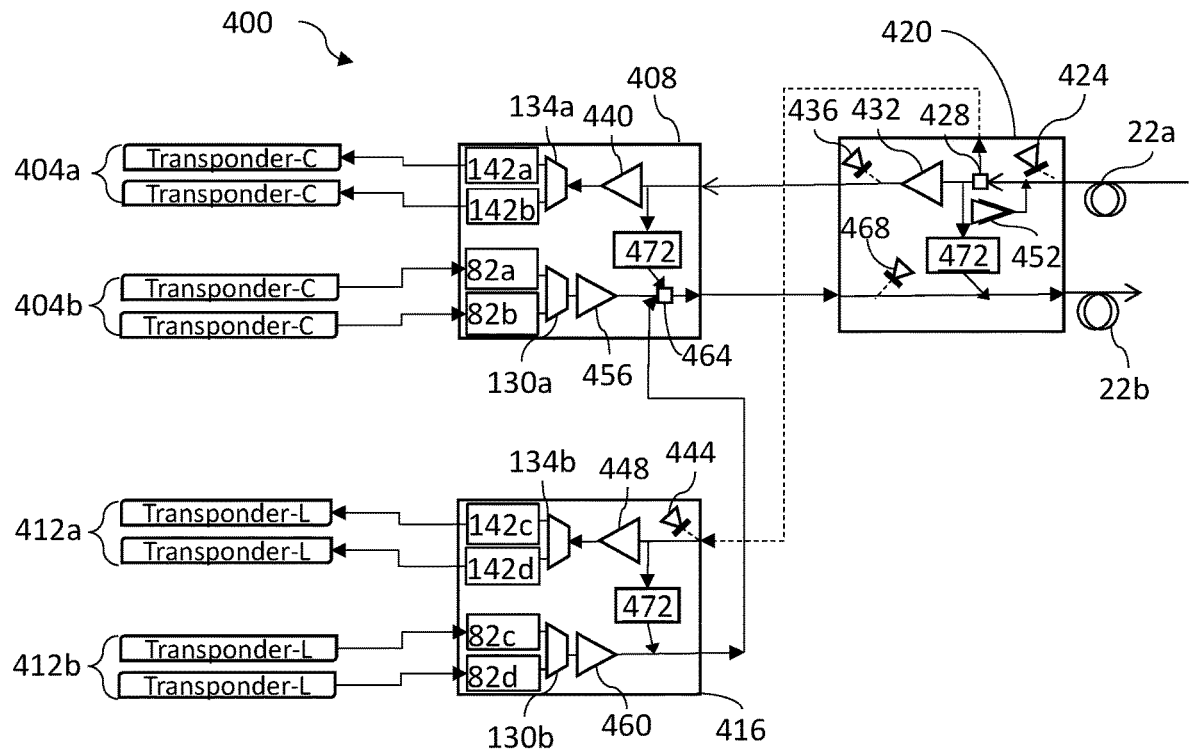
FIG. 10 is a schematic diagram of an exemplary node constructed in accordance with the present disclosure.

Referring now to FIG. 10, shown therein is a block diagram of an alternative embodiment of an exemplary node 400 which may be used to implement the terminal station 14 and/or the one or more in-line node 30. The node 400 has a plurality of C-Band transponders 404, including receivers 404a and transmitters 404b, connected to a C-Band ROADM 408 and a plurality of L-Band transponders 412, including receivers 412a and transmitters 412b, connected to an L-Band ROADM 416, the C-Band ROADM 408 and the L-Band ROADM 416 are coupled together and connected to a hybrid C-Band card 420. The hybrid C-Band card 420 is connected to an optical fiber submarine cable 22a having a first optical data carrier signal 42 traveling in a first direction and connected to an optical fiber submarine cable 22b having a second optical data carrier signal 42 traveling in a second direction different from the first direction. Each of the C-Band transponders 404 and the L-Band transponders 412 is connected to one port of the node 400. Only four ports are depicted in FIG. 10 for simplicity. It is understood that the number of ports in each node 400 may vary depending on hardware used, each installed FRU, capacity requirements, and technology limitations, and therefore the node 400 may also have more than or less than four ports.

The first optical data carrier signal 42 traveling in the first direction enters the hybrid C-Band card 420, is detected by a first photodiode 424 via a tap (not shown) and enters a diverter 428 where a C-Band portion of the first optical data carrier signal 42 passes through an amplifier 432, is detected by a second photodiode 436 receiving the first optical data carrier signal 42 via a tap (not shown), enters the C-Band ROADM 408, is amplified by an amplifier 440, and is then demultiplexed by demultiplexer 134a before traveling to optical receiver 142a and optical receiver 142b, then traveling to receivers 404a of the C-Band transponders 404, and where an L-Band portion of the first optical data carrier signal 42 enters the L-Band ROADM 416, is detected by a third photodiode 444 via a tap (not shown), is amplified by an amplifier 448, and is then demultiplexed by demultiplexer 134b before traveling to optical receiver 142c and optical receiver 142d, then traveling to receivers 412a of the L-Band transponders 412. A Raman pump laser 452 may supply one or more idler signal 50 the first optical data carrier signal 42.

The C-Band portion of the second optical data carrier signal 42 traveling in the second direction originates at transmitters 404b of the C-Band transponders 404, enters optical transmitter 82a and 82b, is multiplexed by multiplexer 130a before being boosted by an erbium-doped fiber amplifier 456. The L-Band portion of the second transmission signal traveling in the second direction originates at transmitters 412b of the L-Band transponders 412, enters optical transmitter 82c and optical transmitter 82d, is multiplexed by a multiplexer 130b before being boosted by erbium-doped fiber amplifier 460. The C-Band portion and the L-Band portion are then combined in combiner 464 to form the second optical data carrier signal 42 that is detected by a fourth photodiode 468 via a tap (not shown) and which further passes through the hybrid C-Band card 420 to the optical fiber submarine cable 22b.

In other embodiments, the node 400 may not include the Hybrid C-Band card 420. Additionally, while receivers 404a and transmitters 404b are shown independently, each transponder 404 is comprised of a transmitter 404b and a receiver 404a. The transponder 404 is diagramed as two elements, the receiver 404a and the transmitter 404b, for simplicity of the diagram. Similarly, while receivers 412a and transmitters 412b are shown independently, each transponder 412 is comprised of the transmitter 412b and the receiver 412a. The transponder 412 is diagramed as two elements, the receiver 412a and the transmitter 412b, for simplicity of the diagram. Alternatively, the receivers 404a may be integrated into the optical receiver 142a and the optical receiver 142b and the transmitters 404b may be integrated into the optical transmitter 82a and 82b. Similarly, the receivers 412a may be integrated into the optical receiver 142c and the optical receiver 142d and the transmitters 412b may be integrated into the optical transmitters 82c and 82d. Each of the C-Band ROADM 408, the L-Band ROADM 416, and the hybrid C-Band card 420 may each have an optical supervisory channel 472.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A method comprising the steps of:
    receiving, by a coherent optical receiver, a first optical data carrier signal at a first instant of time, and a second optical data carrier signal at a second instant of time, the first instant of time and the second instant of time within a time period,
    generating, by the coherent optical receiver, at least four first data streams from the first optical data carrier signal, and at least four second data streams from the second optical data carrier signal;
    calculating, by circuitry, a first aggregate power of the first data streams, and a second aggregate power of the second data streams;
    applying, by the circuitry, an adjustable temporal low pass filter to the first aggregate power and the second aggregate power resulting in a compensation power, the adjustable temporal low pass filter adjusted to achieve a performance metric; and
    phase-rotating, by the circuitry, the first data streams and the second data streams proportional to the compensation power.

2. The method of claim 1, wherein the coherent optical receiver further includes at least four photodiodes.

3. The method of claim 1, wherein the performance metric is determined based on a bit error rate.

4. The method of claim 1, wherein the performance metric is determined based on an error vector magnitude.

5. The method of claim 1, wherein the coherent optical receiver receives the first and second optical data carrier signals via a dispersion compensated fiber optical cable.

6. The method of claim 4, wherein the dispersion compensated fiber optical cable is a slope-matched dispersion compensated fiber optical cable.

7. The method of claim 4, wherein the dispersion compensated fiber optical cable is a dispersion compensated fiber optical cable having a zero-dispersion window.

8. A node comprising:
    a coherent optical receiver module configured to receive, from an optical link, a first optical data carrier signal at a first instant of time, and a second optical data carrier signal at a second instant of time, the first instant of time and the second instant of time within a time period, and generate at least four first data streams from the first optical data carrier signal, and at least four second data streams from the second optical data carrier signal;
    a plurality of photodiodes configured to measure a power of the first data streams and the second data streams; and
    circuitry configured to calculate a first aggregate power of the first data streams, and a second aggregate power of the second data streams; apply an adjustable temporal low pass filter to the first aggregate power and the second aggregate power resulting in a compensation power, the adjustable temporal low pass filter adjusted to achieve a performance metric; and phase-rotate the first data streams and the second data streams proportional to the compensation power.

9. The node of claim 8, wherein the optical link is an optical fiber submarine cable.

10. The node of claim 8, wherein the performance metric is determined based on a bit error rate.

11. The node of claim 8, wherein the performance metric is determined based on an error vector magnitude.

12. The node of claim 8, wherein the optical link is a dispersion compensated fiber optical cable.

13. The node of claim 8, wherein the optical link is a slope-matched dispersion compensated fiber optical cable.

14. The node of claim 8, wherein the optical link is a dispersion compensated fiber optical cable having a zero-dispersion window.

15. A circuit comprising:

a processor;

a non-transitory memory storing executable instructions that when executed by the processor cause the processor to: receive a first optical data carrier signal at a first instant of time and a second optical data carrier signal at a second instant of time, the first instant of time and the second instant of time within a time period; generate at least four first data streams from the first optical data carrier signal and at least four second data streams from the second optical data carrier signal; calculate a first aggregate power of the first data streams and a second aggregate power of the second data streams; apply an adjustable temporal low pass filter to the first aggregate power and the second aggregate power resulting in a compensation power, the adjustable temporal low pass filter adjusted to achieve a performance metric; and phase-rotate the first data streams and the second data streams proportional to the compensation power.

16. The circuit of claim 15, wherein the circuit further includes an ADC connection configured to enable digital communication between an analog-to-digital converter and the circuit, and wherein the first optical data carrier signal and the second optical data carrier signal is received via the ADC connection.

17. The circuit of claim 15, wherein the adjustable temporal low pass filter is adjusted by the circuit.

18. The circuit of claim 15, wherein the adjustable temporal low pass filter is adjusted by a user.

19. The circuit of claim 15, wherein the performance metric is determined based on a bit error rate.

20. The circuit of claim 15, wherein the performance metric is determined based on an error vector magnitude.

* * * * *